United States Patent
Decherf

(10) Patent No.: US 9,727,116 B2
(45) Date of Patent: Aug. 8, 2017

(54) METHOD AND ARRANGEMENT FOR REMOTE CONTROLLING A POWER CONSUMPTION STATE OF A NETWORK DEVICE

(71) Applicant: BARCO N.V.

(72) Inventor: Patrick Oscar Y. Decherf, De Haan (BE)

(73) Assignee: Barco N.V., Kortrijk (BE)

( * ) Notice: Subject to any disclaimer, the term of this patent is extended or adjusted under 35 U.S.C. 154(b) by 341 days.

(21) Appl. No.: 14/141,710

(22) Filed: Dec. 27, 2013

(65) Prior Publication Data
US 2014/0189384 A1   Jul. 3, 2014

(30) Foreign Application Priority Data

Dec. 28, 2012 (GB) .................................. 1223484.5

(51) Int. Cl.
*G06F 1/32* (2006.01)
(52) U.S. Cl.
CPC .................................. *G06F 1/3209* (2013.01)
(58) Field of Classification Search
CPC .................................................... G06F 1/3278
See application file for complete search history.

(56) References Cited

U.S. PATENT DOCUMENTS

| 8,204,990 B1* | 6/2012 | Avery ................. H04L 12/4625 307/112 |
| 2006/0291408 A1* | 12/2006 | Huang .............. H04W 52/0225 370/311 |

* cited by examiner

*Primary Examiner* — Kim Huynh
*Assistant Examiner* — Eric Chang
(74) *Attorney, Agent, or Firm* — Renner, Otto, Boisselle & Sklar, LLP; Grant Steyer

(57) ABSTRACT

The instant invention improves the control of a low-power consumption state of network devices linked to a network switch by a suitable network such as an optical network. It allows for the sleep mode also to shut down the power supplies of the components of the network device necessary for the normal data link layer network communication according to the OSI model and the higher layers of the communication protocols. In the same way, the invention prevents that a disruption of the optical network leads to a sleep mode of the network device. Further, even in a freeze state, it is possible to activate the network device and bring it in a sleep mode. For this purpose, a special communication protocol is provided.

19 Claims, 14 Drawing Sheets

METHOD AND ARRANGEMENT FOR REMOTE CONTROLLING A POWER CONSUMPTION STATE OF A NETWORK DEVICE

The present invention relates to a method or a system and components for the system for remote controlling of a power consumption state of a remote first network device, wherein the network device is linked by a communications network such as an optical network, wired electrical or wireless network to a second network device that has data sources and control functions.

TECHNICAL BACKGROUND

Fast communication networks become more and more important in order to be able to cope with the ever growing communication load caused by an increasingly networked world. At the same time power consumption is an important factor to discriminate a product over the competition and provide cost advantages.

A network switch 150 of the prior art as shown in FIG. 1, for example Extreme Networks X670©, has via its port i an optical fiber Ethernet connection 160, 164, for example 10 Gigabit Ethernet, to a remote network device 170. The other ports of the network switch can be connected to multiple other remote network devices or other devices. Multiple signals such as video signals are streamed from network sources such as video sources over the IP network 130 to the remote network devices 170. The remote network devices 170 have the function of, for example, a H.264 video decoder or transcoder. The remote network devices 170 can also, for example, have a processing function to transform the streamed video signals to a video format compatible to a specific display interface 176, 178 or display format. The remote network device 170 can alternatively or also have a data storage function. The output of the remote network device 170 is for example a DVI (Digital Visual Interface) output for a display 180. These network devices 170 have e.g. also a display control means for example VESA DPMS (Video Electronics Standards Association—Display Power Management Signaling). Management software, here called the "controlling main program" 140, can control some of the functions of the network devices 170.

In another possible configuration as shown in FIG. 2, instead of a display 180 connected to the network device 170, an image capturing device, for example a video camera 280 is connected to the remote network device via a video interface for example IEEE 1394 or SDI or HD-SDI. The camera can be controlled via for example a USB interface. The remote network device 170 can contain for example an encoder function and is connected via an optical fiber Ethernet connection 166, 168 to the network switch 150, to stream the video images over the IP network 130 to other devices connected to the IP network 130.

In another possible configuration not shown in the drawings a computer is connected to the network device 170 via for example a DVI interface or Display Port interface.

For reasons of energy conservation, reduction of operating cost, extension of battery life time and compliance with national or international regulations, it is required that electronic equipment can be preferably put in a sleep mode when the function of that equipment is not required during some time. In the sleep mode the power consumption is substantially reduced compared to the power consumption in the normal mode. For example the power consumption of a network device 170 and its related image display 180 or image capturing device 280 can be reduced to a level of less than 1 Watt, whereas in normal operation mode the power consumption can be of several tens or hundreds of Watts.

At present there is no harmonization of the terminology to describe the power states of electronic and network equipment. The normal mode of operation is also called e.g. the on/active mode. Sleep mode is also called e.g. "standby" or e.g. "low power mode". Also e.g. "deep sleep mode" is sometimes used to indicate lower power consumption than the sleep mode. DPMS defines e.g. four modes: 1.) normal, 2.) standby, 3.) suspended and 4.) off.

In this application for instance the normal mode 1.) is used to indicate the operations mode when the full functionality of the network devices is available. Sleep mode 2.) will preferably be used to indicate a mode of the network device and its related display or image capture device where the normal operation is suspended and the power consumption is substantial lower compared with the normal mode 1.).

Network devices to support streaming media over IP networks are required to perform processing functions, for example decoding, encoding or transcoding, or data storage functions and can be located in many remote locations, very often at locations difficult to access or not directly accessible by the user or the technicians.

In prior art document U.S. Pat. No. 8,068,433 B2 a method is described for low power operation of networked devices, where on detection that the main processor is going to sleep, the processing element enters an active state in which it performs networking operations on behalf of the main processor. And in performing these networking operations on behalf to the main processor entities of the network are not aware that the main processor has gone to sleep. In particular according to the teaching of U.S. Pat. No. 8,068,433 B2 the network connection is not lost but maintained.

In prior art document U.S. Pat. No. 8,271,808 B2 a method is described where a subordinate device can determine whether the main device is operating or stopped by determining whether or not the values of the light-receiving amount stored in the light amount register is "0" continuously for more than a predetermined period. In U.S. Pat. No. 8,271,808 B2 the system can only determine the presence or absence of the light from the main device, but can't determine whether or not the absence of light is caused by stopping operating the main device or it is caused by physically disconnecting the fiber cable.

SUMMARY OF THE PRESENT INVENTION

Embodiments of the present invention provide beneficially a very robust method, system or device to bring network devices and preferably their related devices such as display devices or cameras, optionally remotely especially via their network interface, from normal mode 1.) to sleep mode 2.), and from sleep mode to normal mode.

Advantageously an embodiment of a method or system according to the present invention prevents that a first network device can be brought in the sleep mode when the network connections (e.g. Ethernet, linked by an optical, a wired electrical or wireless network) between a second network device such as a network switch and the first network device are physically disconnected. This is important as physically disconnecting for example the cable such as optical fiber cable or loss of a wireless connection can happen accidently or as part of for example a testing or debugging procedure. When the cable such as an optical fiber or optical cable is disconnected or a wired electrical connection is disconnected or a wireless connection is lost the first network device should not go in sleep mode because otherwise there is a time consuming restart process. During a testing or debugging procedure it is required that the first network devices are not going into the sleep mode by physically disconnecting a cable such as the optical fiber cable or a wired electrical connection or loss of a wireless connection because the restart i.e. bringing the network device from sleep mode to normal mode of such a first network device may take several minutes. Such a waiting time is reducing the work efficiency and complicating the technical process of testing a device. Thus, it should be avoided.

Beneficially an embodiment of the method or system according to the present invention allows, for the sleep mode, to shut-down the power supplies of the components of the first network device necessary for the normal data link layer network communication e.g. according to the OSI model or link layer TCP/IP reference model and advantageously of the higher layers of the communication protocols. Therefore embodiments of the instant invention provide a sleep mode with very low power consumption which is a big technological advantage.

A first network device, being a computing system, can hang or freeze and be in a so called "freeze" state. In such situation the first network device is usually not responding to any standard messages or commands received from other components or processes, for example via its network interface. An embodiment of a method or system according to the instant invention allows that the first network device, although in the freeze state, can still be put in normal mode again via the network; and consequently the first network device and its related display, can then beneficially be brought from the normal mode 1.) to the sleep mode 2.) if this is required. Preferably this is realized according to an embodiment as a very small extension of a method, system or a device of e.g. a standard sleep mode implementation. This is in practical situation very useful and appreciated because advantageously a first network device can be placed in building locations that are difficult to access. This will be called the function "reset on LAN".

There exist standard solutions to bring a network device from sleep mode to normal mode, for example the Wake-on-LAN functionality. However this functionality requires that amongst others the MAC-function (Media Access Control) stays operational in the sleep mode. The MAC layer is a sub-layer of the data link layer. This MAC-function requires that high power consuming parts of the system keep operational, for example the MAC-core implemented in a processing engine such as an FPGA, and therefore powered on in the sleep mode.

Consequently this is reducing substantially the power saving in the sleep mode. Therefore also the MAC-core is part of the system that needs to be shut-down for very low power consumption in the sleep mode in accordance with embodiments of the present invention. Consequently a method or system with the functionality of these embodiments can't make use of for example the Wake-on-LAN functionality, to bring the remote network device form the sleep mode to normal mode.

It is also preferred in embodiments of the present invention if, on detection that a main processor is going to sleep, the processing element does not enter an active state in which it performs networking operations on behalf of the main processor.

In embodiments of a method or system according to the present invention the presence or absence of signals from the transmitter of the main network device e.g. the light signals or electrical from the main network device, or wireless signals of a wireless connection can be determined, and whether or not the absence of signals such as light signals or electrical signals or wireless signals is caused by stopping operating the main device or it is caused by physically disconnecting a cable such as the fiber cable or electrical cable or the loss of a wireless connection can be determined.

Accordingly, embodiments of methods, systems or devices according to the present invention can be more robust in the sense that they can cope with situations of a freeze state of the network device, i.e. the network device is not responding to any network command that needs the support of the data link layer or higher layers of the OSI model or TCP/IP reference model, and physically disconnecting the fiber cable, which corresponds with a received light amount continuously "0", will not initiate the sleep mode.

Embodiments of the present invention are based on solving the problem of how to minimize a power consumption at a low power consumption state of a network device that is attached to a network such as a wired, a wireless or an optical network while at the same time avoiding that the network device enters this state when the network such as the wired, the wireless or the optical network is disrupted. Embodiments of the present invention provide solutions to this problem in form of a method for remote-controlling a power consumption state of a network device according to claim 1 by a communication arrangement according to claim 16, a sleep mode controller according to claim 2 and a network device according to claim 23.

Further developments of the invention are given in the dependent claims.

BRIEF DESCRIPTION OF THE DRAWINGS

Subsequently, embodiments of the invention are described by way of drawings showing examples, wherein.

Reference signs are used consistently throughout the drawings in a manner that the same reference sign denominates the same or corresponding object.

DESCRIPTION OF DETAILED EMBODIMENTS OF THE PRESENT INVENTION

The present invention relates to a method or a system and components for the system for remote controlling of a power consumption state of a remote first network device, wherein the first network device is linked by a communications network such as an optical network, wired electrical or wireless network to a second network device that has data sources and control functions. In the following reference will be made to an optical network in order to explain the invention but this is done purely for simplicities sake. Although the present invention is particularly suitable for optical networks it can also be applied to wired and wireless networks. It should therefore be understood that everywhere where there is reference to optical networks the same features, functions, software, hardware or advantages apply equally to equivalent elements of a wired or wireless network.

Figure 3:
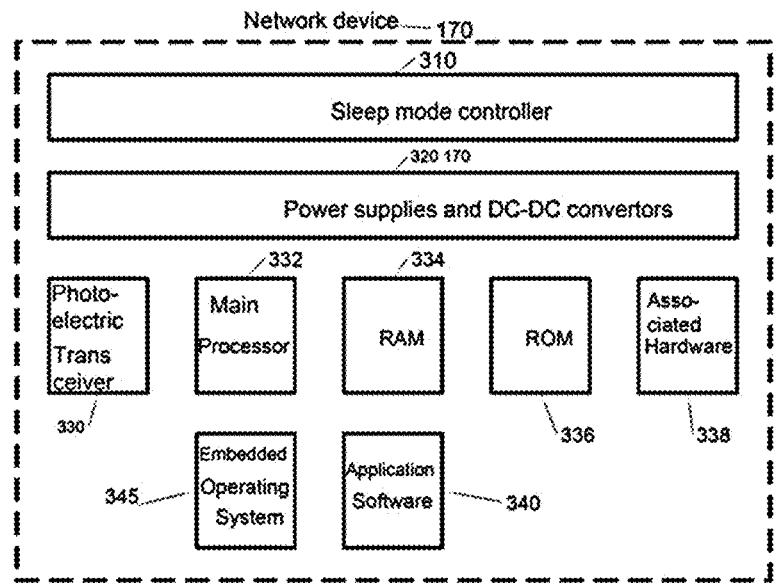
FIG. 3 shows components of a network device.
Figure 4:
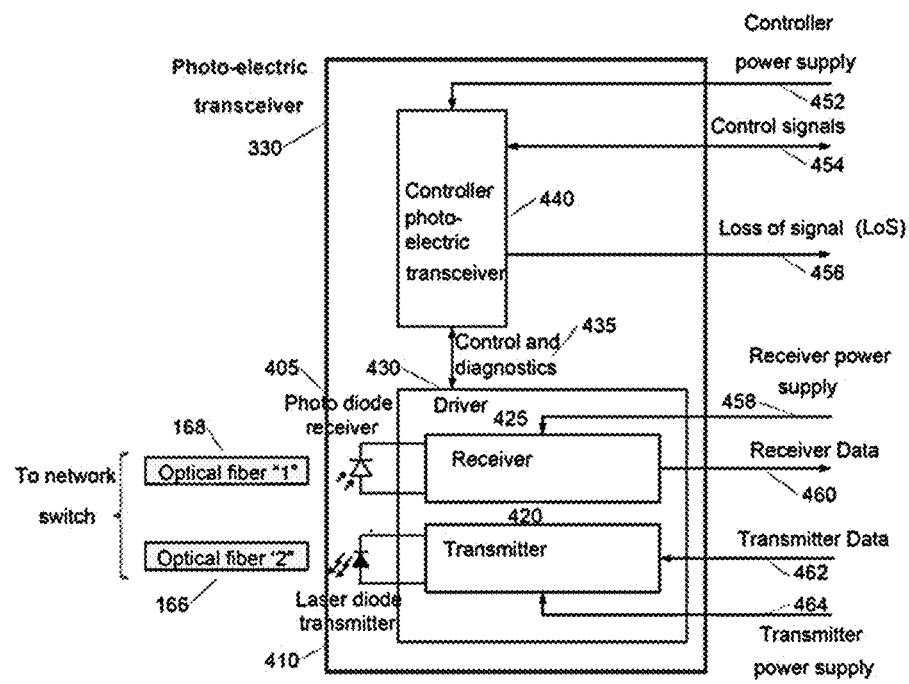
FIG. 4 shows an example of a photoelectric transceiver.

An embodiment of a system and a network device and its components 170 depicted in FIG. 3 according to the present invention contains a network such as an IP network, a transceiver such as an optical, electrical or wireless transceiver such as comprising a photo-electric transceiver 330 as shown in FIG. 4 for example a 10 Gb/s 850 nm SFP (Small Form Factor Pluggable), a main processing engine such as a processor 322, first memory such RAM 334, and second memory such as ROM 336, associated hardware 338, for example secondary processing engines such as FPGAs (Field Programmable Gate Arrays) for image processing and network related functionalities, for example, one or more power supplies 320, optional DC-DC convertors, an embedded operating system 345 and specific embedded application software 340. The function of the remote network device 170 is for example to decode or encode or transcode or execute a specific processing function on the received or transmitted data, for example video images. An embodiment of the network device can also have, additionally or specifically, a data storage function.

FIG. 4 shows components of an embodiment and in- and outputs of a photoelectric transceiver 330. For example, a photoelectric receiver 425 e.g. with associated photodiode 405, a photoelectric transmitter 420 e.g. with associated laser diode 410, a controller 440, a driver 430, a control signal 435 and power supply lines 452, 458 and 464 can be provided. Also signal lines 454, 460 and 462 are shown. In general all optical or electrical cables or lines as described with reference to the present invention can be replaced by their equivalent wireless connections. Of particular interest for embodiments of the instant invention is a Loss Of Signal—LoS—Line or connection 456 which is also shown.

According to an embodiment of the instant invention a transition from normal mode to sleep mode and from sleep mode to normal mode via the network is facilitated.

Conventionally the power consumption of the network device 170 and its related device such as an image capturing device 280 such as a camera or display 180 is in normal mode at a level of several tens or hundreds of Watts. According to an embodiment of the instant invention it is possible to bring the remote network device 170 and optionally its related display 180 or image capturing device 280, e.g. camera, via the network in a sleep mode. In this sleep mode the power consumption is substantially lower compared with the normal mode, for example less than 10 Watts or less than 1 Watt, whereas in normal mode the power consumption can be several tens of Watts or hundreds of Watts. It is also required to bring the network device and its related device such as a display device or image capturing device from sleep mode to normal mode via the network.

When e.g. port i of a main network device such as the network switch 150 connected to the remote network device 170 via a communications connection e.g. optical fiber cable 166, 168, is disabled then the transmitter e.g. optical transmitter such as a diode laser of the fiber output line 160 of port i will be shut down, and the controller 440 of the receiver such as the photo-electric transceiver 330 will detect a "loss of signal" LoS 456, for example the LoS signal becomes then e.g. binary HIGH as indicated in FIG. 4. This LoS output can e.g. be used to switch off the power supplies 320, in FIGS. 3 and 11, that provide the power to all the electronic parts except the photo-electric transceiver. When port i is enabled again, then the LoS signal 456 of the transceiver's controller 440 becomes e.g. binary LOW, and this signal can be used to switch on the power supplies that provide the power to all the electronic parts of the remote network device.

Any signal with an equivalent function as the LoS signal can be used for the purpose described above.

Figure 1:
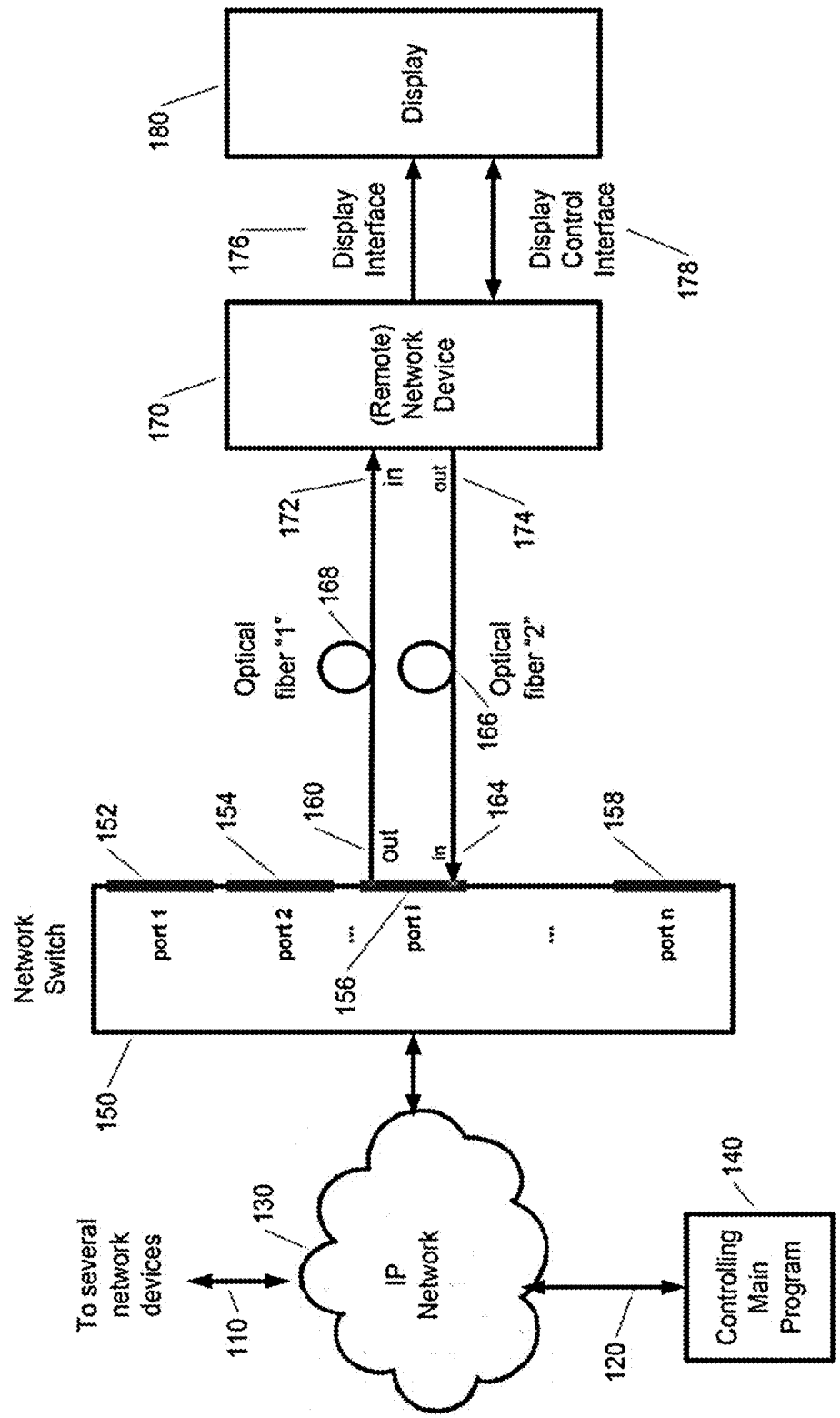
FIG. 1 shows an architecture of a known system comprising the network device, network switch, display, network and controlling main program.
Figure 2:
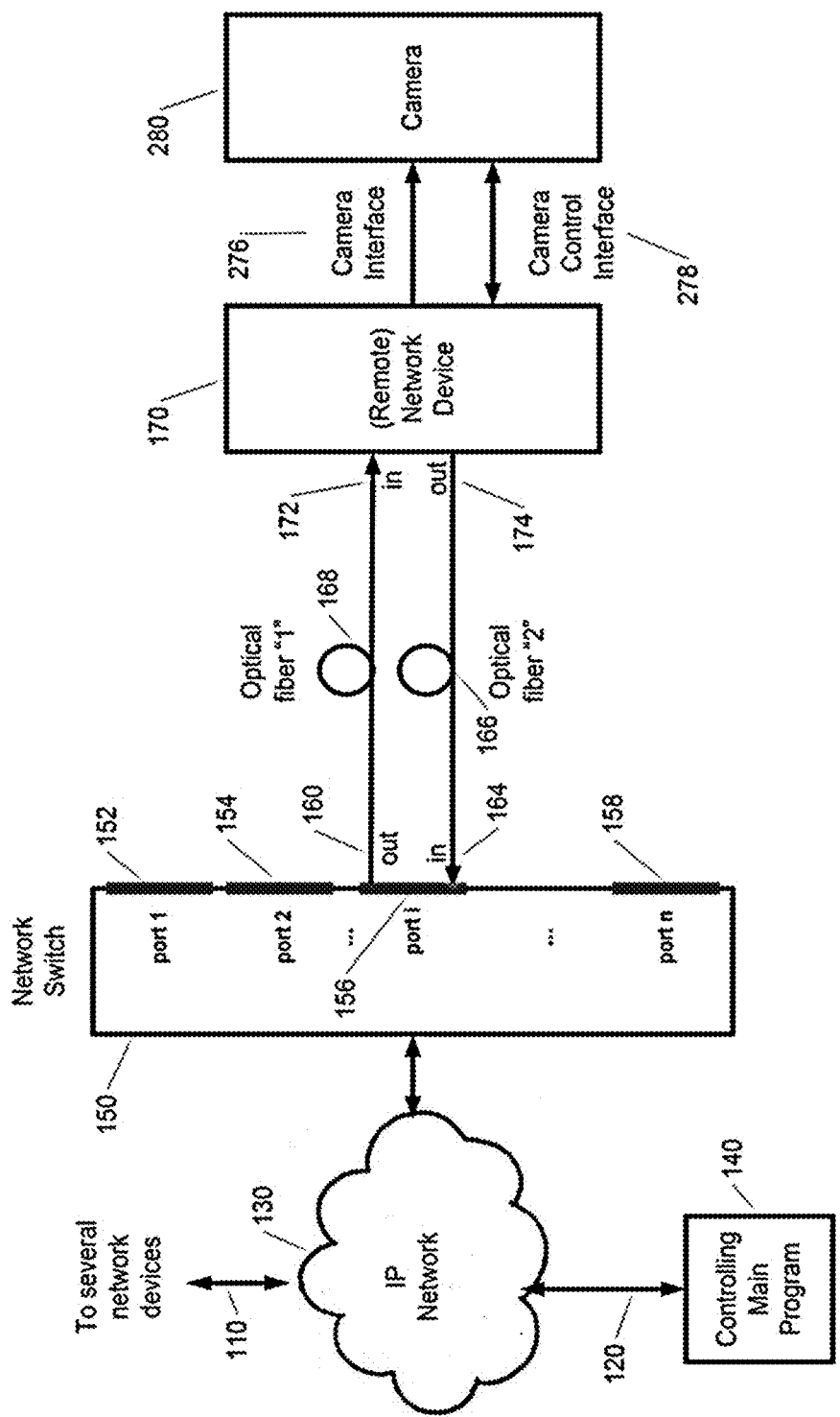
FIG. 2 shows an architecture of a known system comprising the network device, network switch, camera, network and controlling main program.

Interrupting communications on the network, e.g. by physically disconnecting the optical fiber connection 168 of FIGS. 1, 2, 4 for example accidently or for the purpose of maintenance or testing or debugging, will also preferably not bring the network device 170 in the sleep mode. If sleep mode were to be entered then, when the network connection is restored, e.g. this fiber 168 is re-connected to the remote network device 170, the electronics of the remote network device 170 will be powered on again and start up. The start-up process needs some time, for example several minutes, because e.g. the system must be completely re-initialized. This is an important drawback because this is disturbing and delaying the testing or maintenance or debugging work.

The disabling of port i can e.g. be effected by a "controlling main program" 140, for example a program that controls the distribution of video sources over the IP network 130 and to the network devices 170. This program can send a command or message to the network switch 150 to disable this port i.

An abrupt termination of the software processes running on the main processor 332, and the hardware functions in execution on the network device can be harmful or even damage the network device 170. Therefore it has advantages to provide a more controlled process to go from the normal mode to the sleep mode.

In order to avoid the problems explained in the paragraphs above, a controlled and robust system and process and system components for transitions from normal mode to sleep mode and from sleep mode to normal mode will be described according to an embodiment of the instant invention. The method, or system or system components will also be described in terms of a solution in case the network device 170 is in the freeze state.

The implementation according to an embodiment preferably requires a simple communication protocol, signaling pulses and a sleep mode controller 310 in the network device 170.

Figure 7:
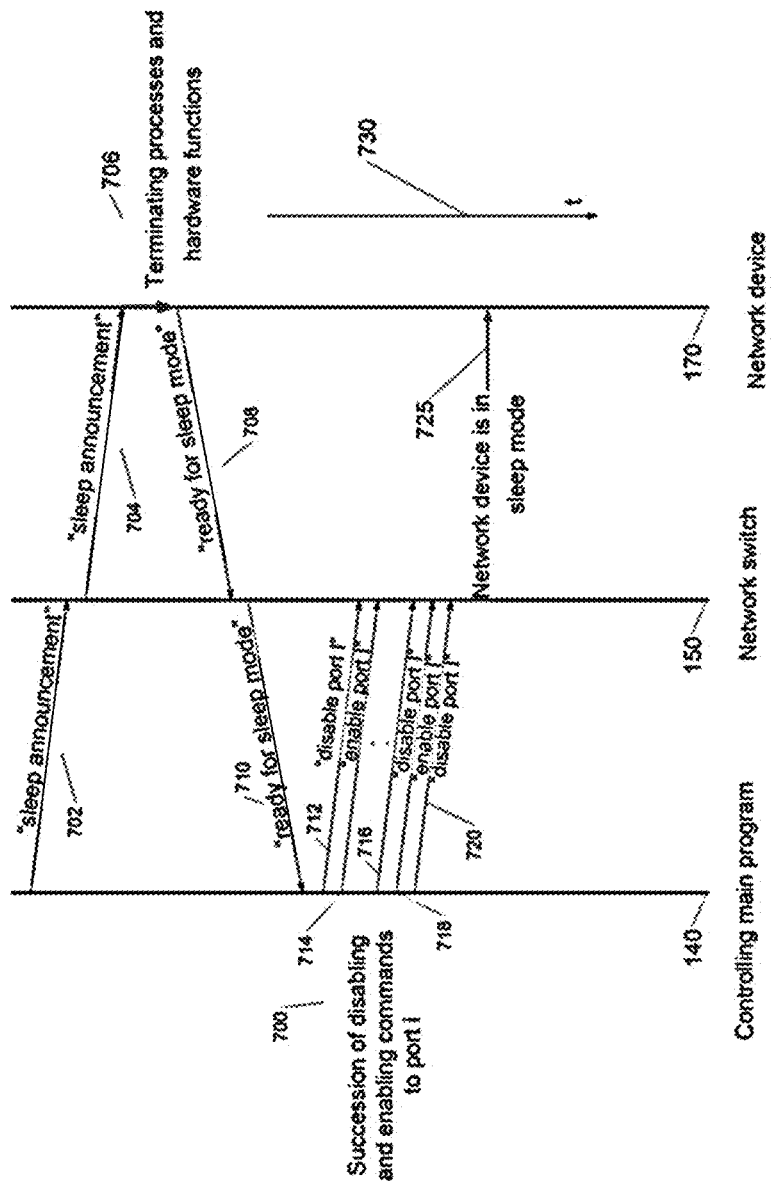
FIG. 7 shows a sequence of messages between a controlling main program, a network switch and a network device, wherein the LoS pulses are generated by sending a succession of disable and enable commands to port i.
Figure 8:
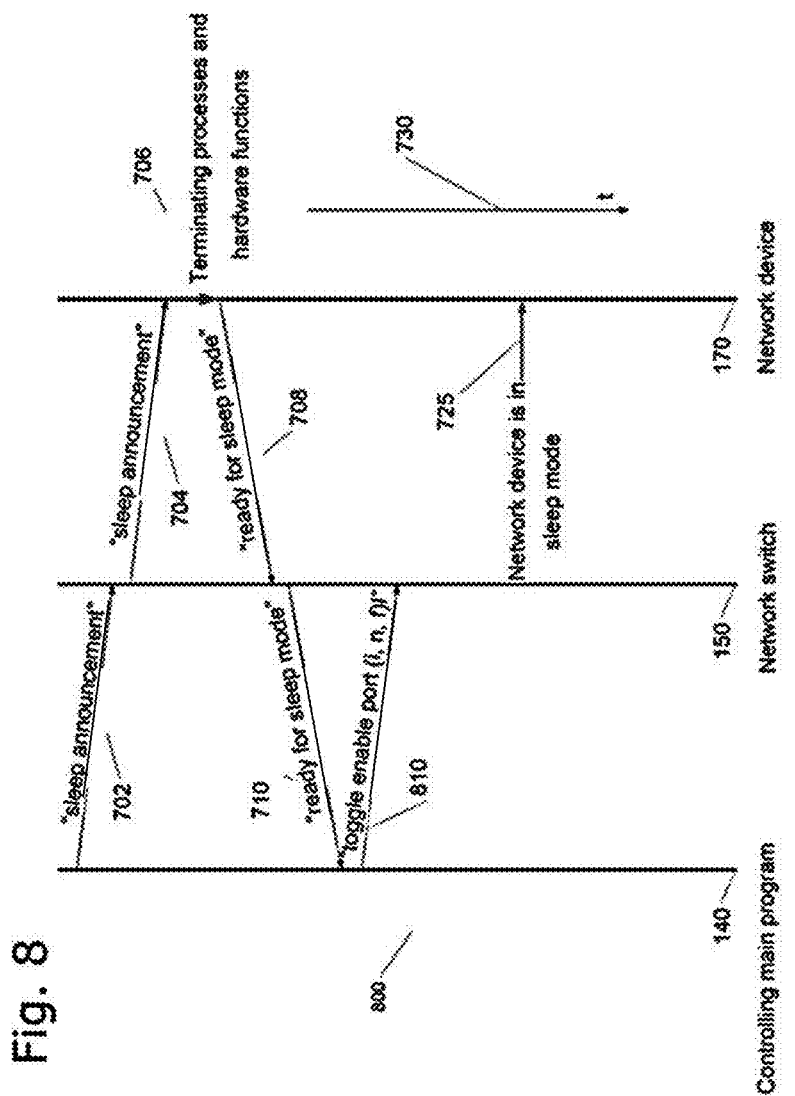
FIG. 8 shows a sequence of messages between the controlling main program, the network switch and the network device, wherein in this case the LoS pulses are generated by sending a command toggle enable port (i, n, f)

According to FIGS. 7 and 8 the first part of an embodiment of a communication protocol according to the instant invention is shown.

A robust system or method according to this embodiment is adapted to bring the network device 170 and its related device such as a display device 180 or image capturing device 280 from normal mode to sleep mode and starts e.g. by the sending of a "sleep announcement message" 704 to the network device 170. This can be achieved by sending a first "sleep announcement message" 702 from a controlling main program 140 via the network to the network switch 150 and from there as the "sleep announcement message" 704 to the network device 170 or by any other means.

Preferably, upon reception of this command the main processing engine such as main processor 332 of the network device 170 will prepare the network device 170 for the upcoming sleep mode by terminating its processes and hardware functions. Beneficially, this will avoid the harmful consequences of an abrupt termination of the processes and hardware functions.

Preferably, the main processing engine such as the main processor 332 of the network device 170 will, upon termination of its processes and hardware functions, send a message "ready for sleep mode" 708, 710 to the controlling main program 140, and will also preferably indicate to the sleep mode controller 310 that the system of the network device 170 is ready for sleep mode. It will preferably do this by bringing the ready for sleep mode line 1330 in FIG. 13 to HIGH.

The network device 170 will preferably now, before taking any further actions, wait for a first specific signal indicating a request for sleep mode such as pulses on its LoS line 456 or equivalent connection. Shutting down the transmitter such as the laser diode in the network switch 150 and consequently bringing the LoS signal to continuous HIGH must preferably not have any effect on the network device 170 because it is not desired that the network devices go in sleep mode by physically disrupting the network, e.g. by disconnecting the network optical fiber 168.

Providing the network device 170 with the first specific signal such as pulses on its LoS line 456 is beneficially implemented in embodiments of the present invention because it allows bringing the network device 170 into normal mode and afterwards in sleep mode when the network device 170 is in a freeze state. In a freeze state the network device 170 will not react on any network command or message it receives. Another useful application is to bring the network device 170 from the freeze state to the normal mode and then continue to use the network device 170 in the normal mode.

Figure 5:
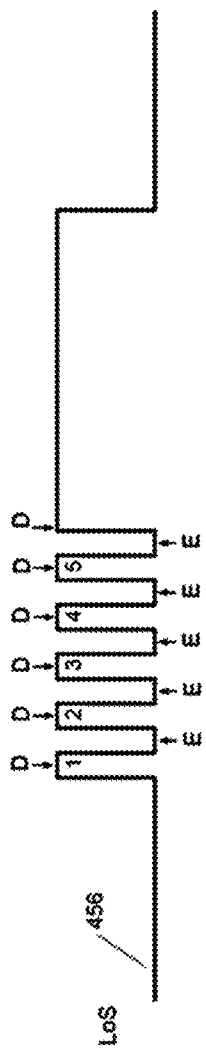
FIG. 5 shows a succession of disabling (D) and enabling (E) commands which result in this example in $n_1$ pulses on the LoS line ($n_1$=5)

After receiving the message "ready for sleep mode" 710 the controlling program 140 will send a command which will enable the first specific signal to be transmitted by the optical transmitter such as the laser diode of port i. For example, such a command can be to switch off and switch on the transmitter such as the laser diode of port i, which is the port of the network switch 150 connected to network device 170, e.g. at a very low rate, for example at a frequency between 10 Hz and 0.1 Hz. This can be done, for example, by sending a sequence of disabling and enabling commands to this port of the network switch 150 as shown in FIG. 7. FIG. 5 shows the result on the LoS line of a succession of disabling (D) and enabling (E) commands as an example of $n_1$ pulses on the LoS line with $n_1=5$ in this example.

Figure 6:
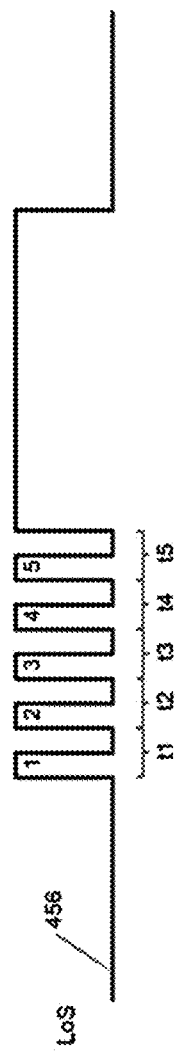
FIG. 6 shows a signal where a network switch toggles $n_1$ times port i ($n_1$=5)

Another possible implementation is to send a command from the controlling main program 140 to the network switch 150 to enable the first specific signal, for example, to enable toggling of port (i, $n_1$, f), of the network switch as depicted in FIG. 8 FIG. 6 shows the result on the LoS line of toggling $n_1$ times port i of the network switch 150 with $n_1=5$ in this example. Upon receiving this command the network switch 150 will preferably $n_1$ times toggle port i at a frequency of f Hz. If this command is not available in the network switch 150, it is e.g. possible to implement this function in the firmware or embedded software of the network switch 150. It is also possible to implement this command in the network switch via SNMP (Simple Network Management Protocol) or by e.g. a vendor specific scripting. In embodiments of the present invention preferably a sequence of $n_1$ pulses is required, and the final state of the LoS line must preferably be HIGH.

FIG. 7 depicts a Sequence of messages between the controlling main program 140, the network switch 150 and the network device 170. In this case the specific signal comprises LoS pulses generated by sending a succession of disable and enable commands to port i.

FIG. 8 depicts another Sequence of messages between the controlling main program 140, the network switch 150 and the network device 170. In this case the specific signal comprises LoS pulses generated by sending a command toggle enable port (i, n, f).

Figure 9:
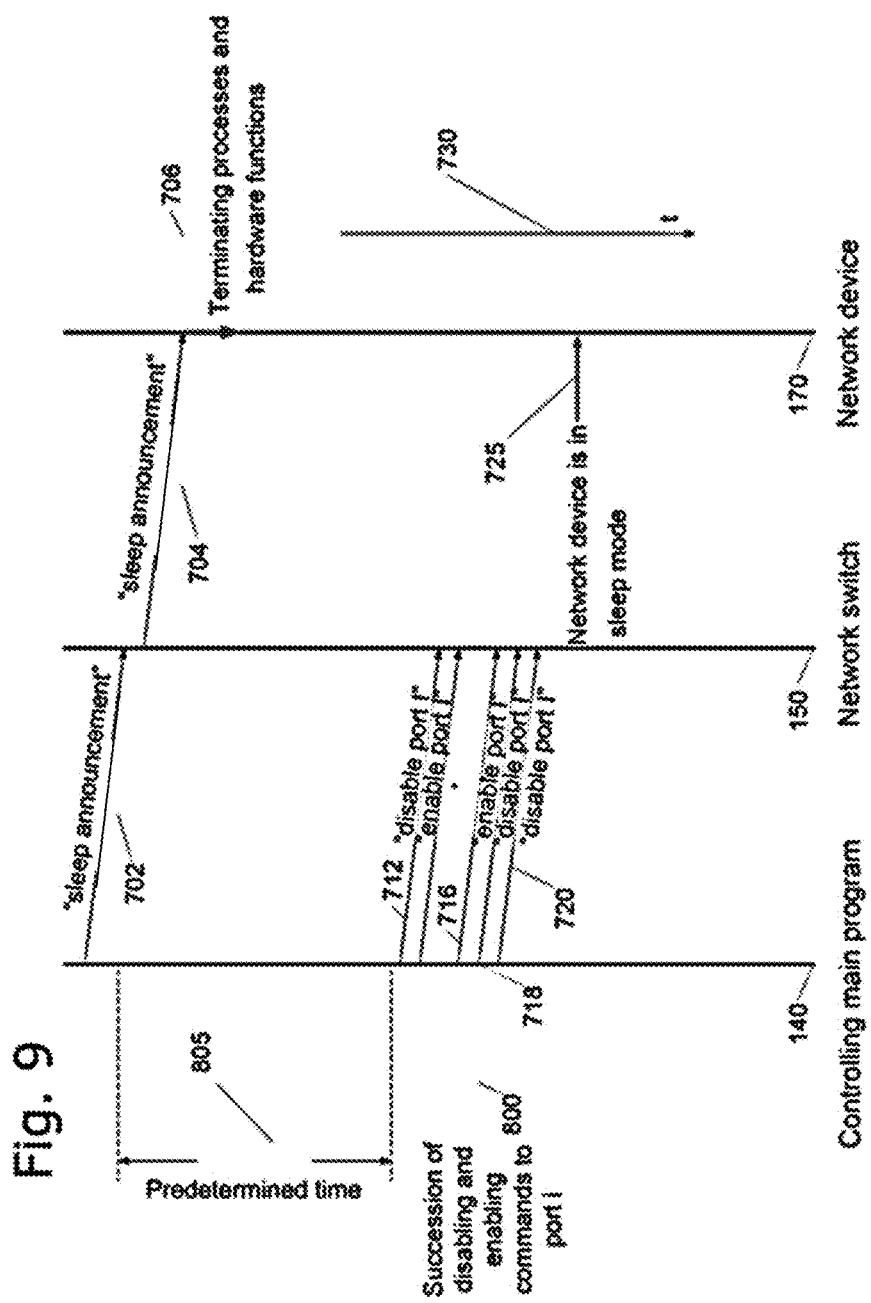
FIG. 9 shows an example wherein if after a predetermined time, there is no answer from a network device on the sleep announcement, then a succession of $n_2$ disable and enable commands is sent to port i.
Figure 10:
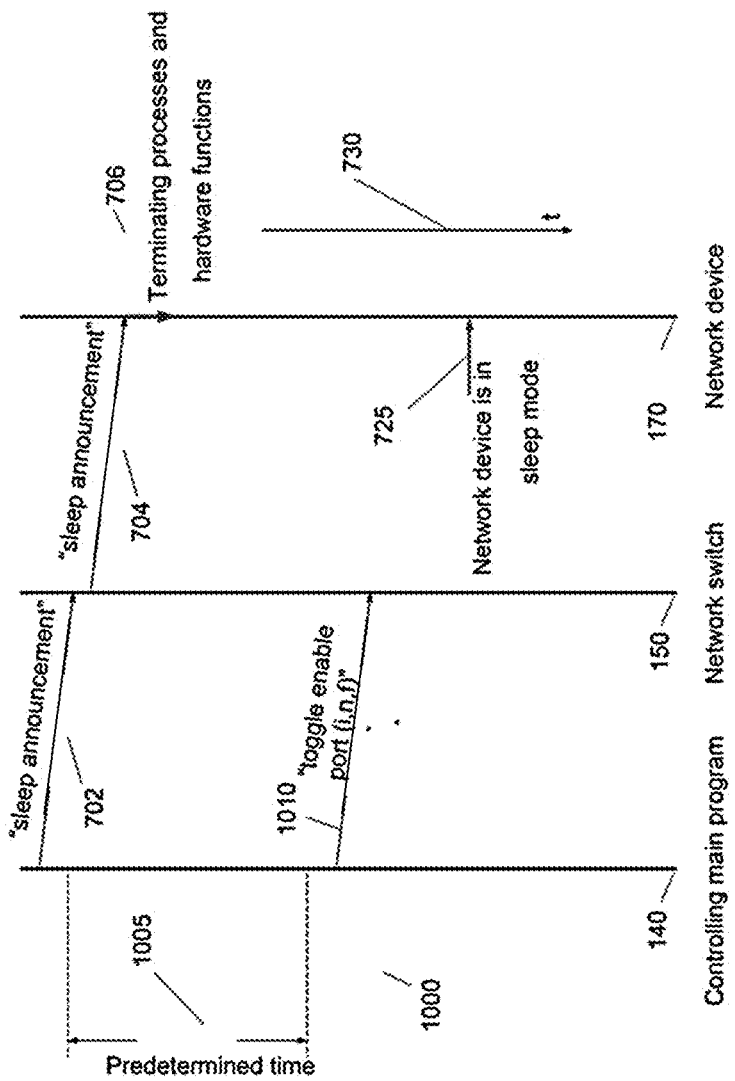
FIG. 10 gives an examples wherein if after a predetermined time there is no answer from the network device on the sleep announcement, then a command toggle port (i, $n_2$, f) is sent to the network device.

With reference to FIGS. 9 and 10, in case the network device 170 is not responding to the message sleep announcement 704 by sending back to the controlling program a message ready for sleep mode 708, 710, then preferably a power cycle 800, 1000 will be initiated. This power cycle 800, 1000 is necessary when the main processor is in a freeze state. This power cycle 800, 1000 will be beneficially initiated after a predetermined time 805, 1005 respectively after sending of the sleep announcement 702. Because the network communication is not working any more, a second specific signal such as pulses on the LoS line 456 will be made to indicate the request for a power cycle. In order to distinguish this request for a power cycle from the transition to the sleep mode, the second specific signal can be distinguished from the first specific signal, e.g. it comprises $n_2$ pulses, with $n_2>n_1$. Optionally, $n_2$ could be less than $n_1$ and/or the frequency could be different. It is again possible to use a succession of disable and enable commands for that particular port i as shown in FIG. 9 or to use a specific command "toggle port (i, $n_2$, f)" as depicted in FIG. 10.

FIG. 8 shows that if, after a predetermined time 805, there is no answer from the network device 170 on the sleep announcement, then a succession of $n_2$ disable and enable commands will be send to port i.

FIG. 9 shows that if, after a predetermined time 1005, there is no answer from the network device 170 on the sleep announcement, then a command "toggle port (i, $n_2$, f)" will be sent to the network device.

Figure 11:
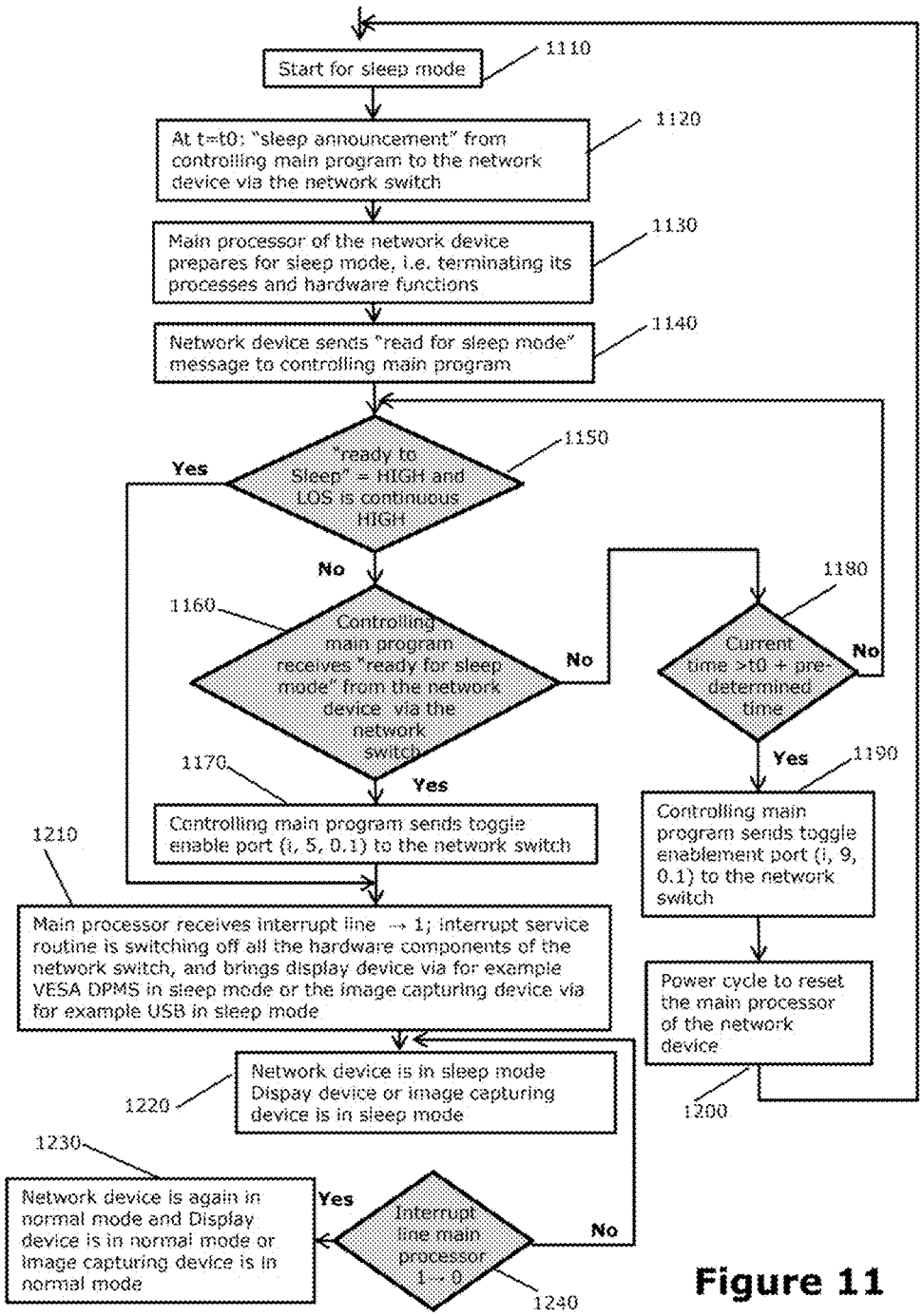
FIG. 11 shows a flow chart containing different power states and transitions between them.

An embodiment of a sleep mode controller 310 has preferably following functions:

Preferably 6 cases shown in Table 1 and FIG. 11 should be considered:
  (1) The LoS line 456 is continuously LOW, the system is in normal mode and must stay in normal mode (independent of the status of the "ready to sleep" line).
  (2) The LoS line 456 is continuously HIGH and the ready to sleep 1330 line is LOW, this indicates that the optical fiber cable is disconnected, the network device 170 must preferably stay in the normal mode.
  (3) The LoS line 456 shows $n_1$ pulses, for example 5 pulses and the ready to sleep line is HIGH, which preferably indicates that the network device 170 is already prepared for the sleep mode and that the shut-down of the power supplies of the network device 170 for the sleep mode must be executed. Also the related device such as the display device 180 or the image capturing device 280 will be preferably forced to the sleep mode via, e.g. in case of the display, the display control interface 178, for example VESA DPMS (Video Electronics Standards Association, Display Power Management Signaling) or in case of the camera, via the camera control interface 278, for example USB. (see also FIG. 14)
  (4) The LoS line 456 shows $n_2$ pulses, which preferably indicates that the network device 170 didn't react within the predetermined time 805 on the sleep announcement 704 by sending a ready for sleep mode 708 message to the main controlling program 140. This indicates preferably that the processor 332 is in the freeze state. In this case a power cycle 800, 1000 or reset operation will be preferably executed, i.e. the power line of the main processor 332 will be brought to 0 V and be powered up again after some time. This is the "reset on LAN" function In this implementation $n_2=10 > n_1$. (FIG. 15)
  (5) A special situation can occur when the optical fiber 168 is disconnected just after the main program 140 has sent the network device 170 ready for sleep mode 708. In this case the LOS line 456 will be continuously HIGH and the ready to sleep line 1330 will be HIGH as well. The sleep mode controller 310 must preferably shut down the power supplies for the sleep mode.
  (6) Finally the network device 170 has to be brought from the sleep mode to the normal mode, this happens preferably when the LoS 456 line transitions from HIGH to LOW and stays LOW during a minimum time $\Delta t_2$. This happens when the port i of the network device 170 is again enabled during at least a time $\Delta t_2$, for example 16 s.

TABLE 1

Summary of the 6 cases with the input signals for the sleep mode controller and the required actions. (X means that the "ready to sleep" line can be either HIGH or LOW)

| Case | Inputs sleep mode controller | | Action |
|---|---|---|---|
| | LoS | Ready to sleep | |
| 1 | LOW continuous | X | Continue normal mode; keep power supplies ON |
| 2 | HIGH continuous | LOW | Fiber cable is disconnected continue normal mode; keep power supplies ON |
| 3 | $n_1$ pulses | HIGH | Shut down the power supplies for sleep mode |
| 4 | $n_2$ pulses | X | Power cycle |
| 5 | HIGH continuous | HIGH | Shut down the power supplies for sleep mode |
| 6 | HIGH→ LOW and stays LOW during at least a time $\Delta t_2$ | LOW | Bring the network device from the sleep mode in the normal mode |

FIG. 1 shows a flow chart of an embodiment of a method according to the present invention in particular including sleep mode, normal mode and power cycle.

In an embodiment shown in FIG. 11 the system is adapted to provide the method which has the following steps:
1110 Start for sleep mode
1120 At t=t0: "sleep announcement" from controlling main program to the network device via the network switch
1130 Main processor of the network device prepares for sleep mode, i.e. terminating its processes and hardware functions
1140 Network device sends "ready for sleep mode" message to controlling main program
1150 "ready to sleep"=HIGH and LOS is continuous HIGH
1160 Controlling main program receives "ready for sleep mode" from the network device via the network switch
1170 Controlling main program sends command to generate a first specific signal, e.g. send a command to toggle enable port (i, 5, 0.1), to the network switch
1180 Current time>t0+pre-determined time
1190 Controlling main program sends a command to enable a second specific signal e.g. sends a command to toggle enable port (i, 9, 0.1) to the network switch
1200 Power cycle to reset the main processor of the network device
1210 Main processor receives interrupt line 0→1; interrupt service routine is switching off all the hardware components of the network switch, and optionally brings related devices such as display device via for example VESA DPMS in sleep mode or image capturing device via for example USB in sleep mode.
1220 Network device is in sleep mode, related device such as display device or image capturing device is optionally in sleep mode
1230 Network device is again in normal mode and related device such as display device or image capturing device is in normal mode
1240 Interrupt line main processor 1→0

Figure 12:
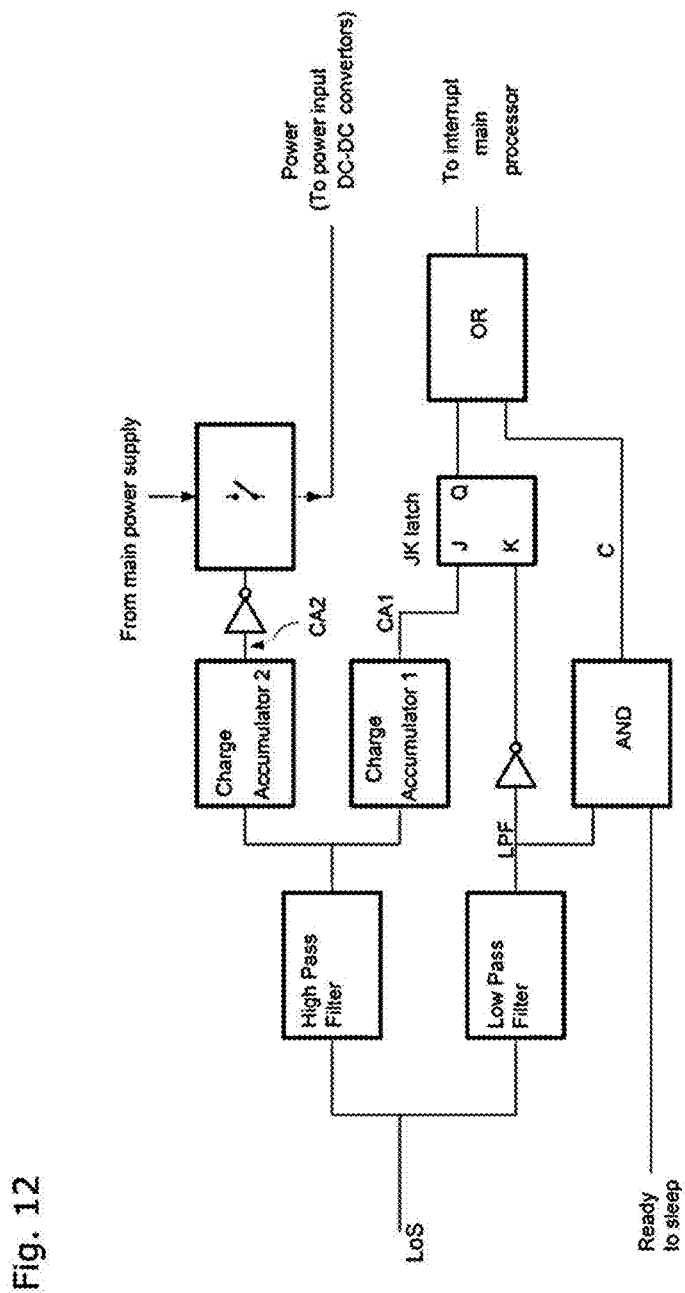
FIG. 12 shows a schematic diagram of an embodiment of sleep mode controller.

FIG. 12 shows an example of an embodiment of a sleep mode controller.

Figure 13:
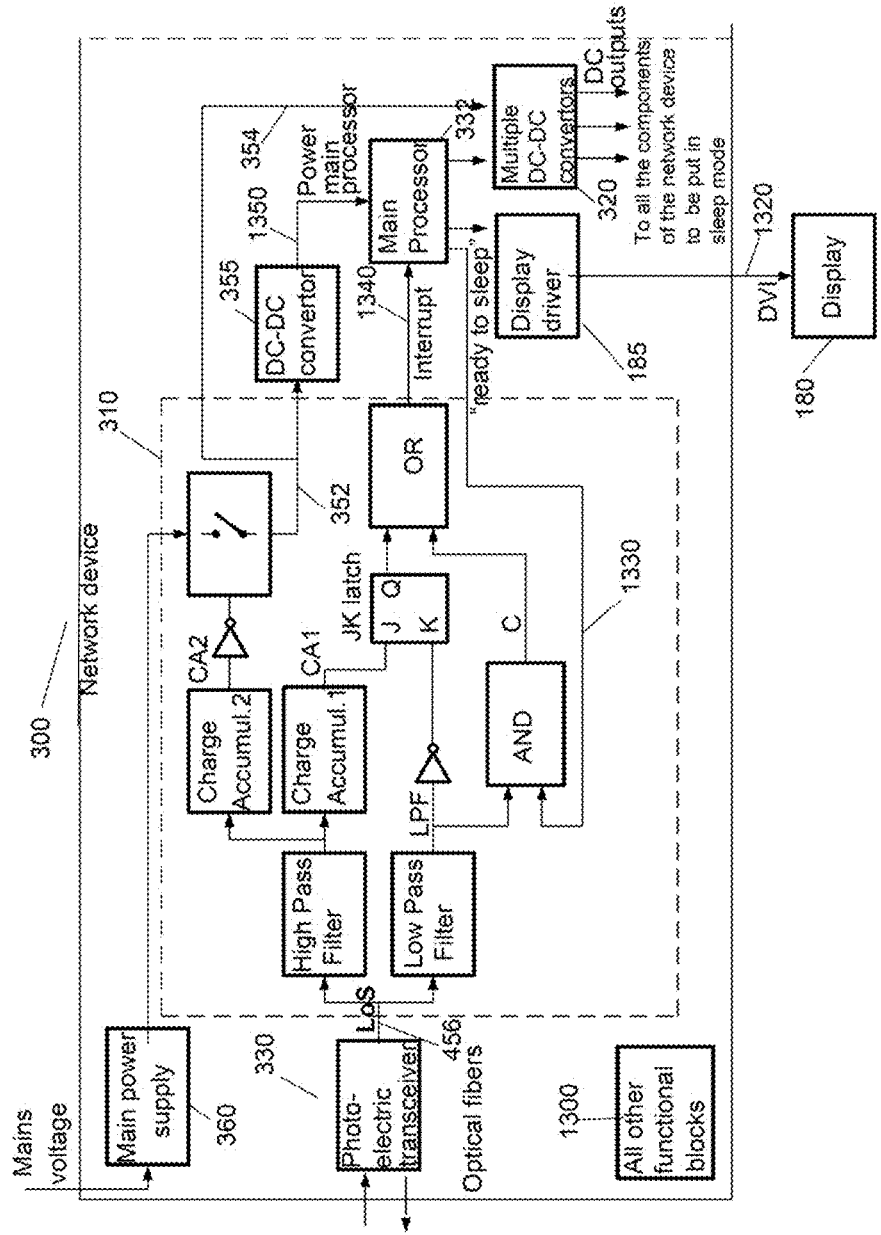
FIG. 13 shows a diagram of an operation of the sleep mode controller in the network device.

The sleep mode controller 310 according to this embodiment should preferably distinguish six cases:
(1) LoS line 456 is continuously LOW, independent of the "ready to sleep" signal
(2) LoS line 456 continuous HIGH while ready to sleep 1330 is LOW
(3) First specific signal such as $n_1$ pulses on the LoS line 456 while ready to sleep signal 1330 is HIGH
(4) Second specific signal such as $n_2$ pulses on the LoS line 456
(5) LoS 456 continuous HIGH while ready to sleep 1330 is HIGH
(6) LoS 456 transition from HIGH→LOW and stays LOW during at least $\Delta t_2$ For this purpose a sleep mode controller 310 is preferably adapted in form of a suitable hardware implementation. Beneficially it is designed as a circuit that consumes very little power. The functional block diagram is given in FIG. 12 with corresponding state tables Table 2 and Table 3. In this embodiment the dimensioning of the sleep mode controller 310 (charge accumulator 1, charge accumulator 2, high pass filter and low pass filter) was done for pulses at a frequency of 0.1 Hz. It is possible to dimension this circuit for pulses at higher frequency for example 10 Hz. FIG. 13 shows the sleep mode controller 310 in the network device.

FIG. 13 shows an embodiment according to the present invention where the sleep mode controller 310 is built into in the network device 170. It can be integrated as separate circuit board, an integrated circuit, integrated circuits, FPGA or a combination of general purpose hardware controlled by a piece of suitable software.

The sleep mode controller 310 in an embodiment contains one high pass filter, one low pass filter, two charge accumulators, a JK latch and a (CMOS) switch to connect or disconnect the power line 352 to the main processor 332 of the network device 170. The output of charge accumulator 1 will transition from LOW to HIGH after $n_1$ pulses on the LoS line, the output of the charge accumulator 2 stays LOW after $n_1$ pulses on the LoS line 456. The output of charge accumulator 2 will transition from LOW to HIGH after $n_2$ pulses on the LoS line, with $n_2 > n_1$. This sleep mode controller 310 has also an output to an interrupt input 1340 of the main processor 332 of the network device 170. The inputs of the "sleep mode controller" are the LoS signal 456 and the "ready to sleep" signal 1330.

TABLE 3

State table of JK latch

| J | K | Q next | comment |
|---|---|--------|---------|
| 0 | 0 | Q | no change |
| 0 | 1 | 0 | reset |
| 1 | 0 | 1 | set |
| 1 | 1 | $\overline{Q}$ | toggle |

Figure 14:
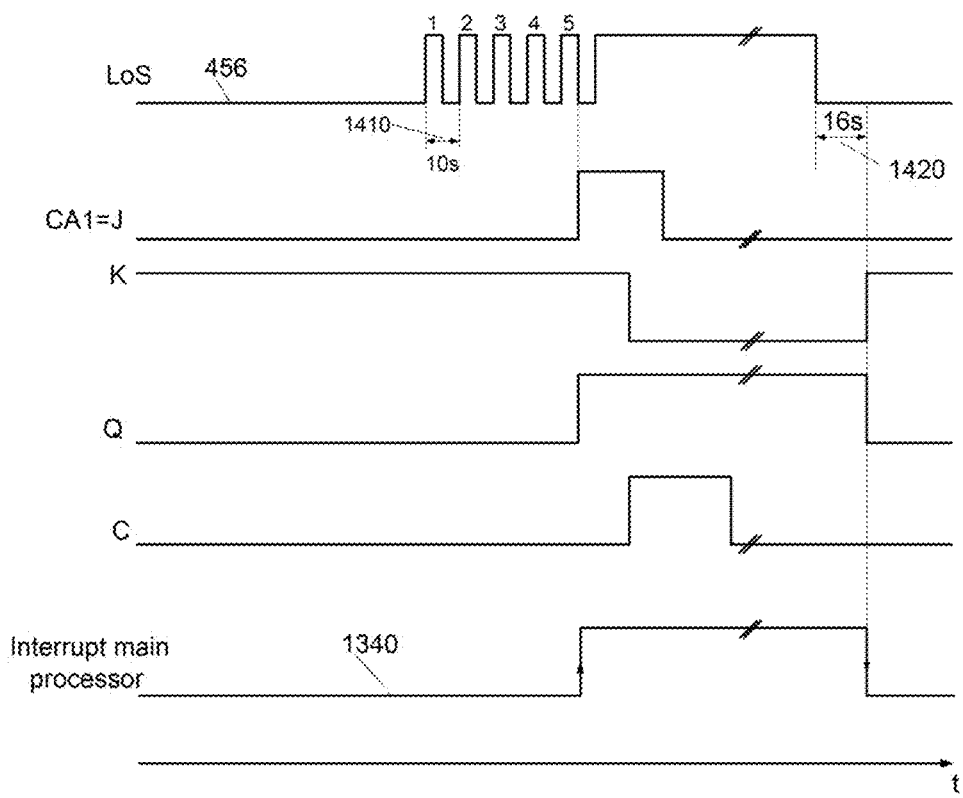
FIG. 14 shows an example of waveforms for the transition from normal mode to sleep mode and sleep mode to normal mode.

Preferably the sleep mode controller 310 as shown in FIG. 13 is designed to trigger the following cases:

Case 3:
E.g. when the LoS output 456, from the photo-electric transceiver 330, provides a first specific signal such as $n_1$ pulses, for example $n_1=5$ at a frequency of for example 0.1 Hz, then the interrupt line 1340 to the main processor 332 will e.g. show a transition from LOW to HIGH after the $n_1$th pulse, and stay HIGH, e.g. by proper dimensioning of the time constant of the low pass filter and charge accumulator 1. The corresponding waveforms are shown in FIG. 14. It is important to remark that the output of the LPF should become HIGH (caused by a HIGH LoS) before the output of the charge accumulator 1 becomes LOW.

An interrupt service routine will be preferably started upon receiving this interrupt signal 1340. The main processor 332 executes this interrupt service routine and will switch off the power output lines of 320 to all the electronic devices that must be switched off during the sleep mode. This includes all the components except the main processor 332, the controller 440 of the photo-optical transceiver, the receiver 425 of the photo-optical transceiver and the sleep mode controller 310. It is important to remark that the transmitter 420 of the photo-electric transceiver 330 may be switched off as well. In this embodiment, switching off the power lines is done by disabling the DC-DC convertors for the components that must be switched off during the sleep mode. The main processor 332 will also preferably bring its related device such as the display 180 or image capturing device 280 in the sleep mode via for example the VESA Display Power Management Signaling (DPMS) for the display and via for example USB for the image capturing device. Finally the main processor 332 will go in a sleep mode, but its interrupt line 1340 can bring the main processor 332 again in the active state. The main processor's sleep mode can be beneficially implemented according the processor power states as described in the Advanced Configu-

TABLE 2

State table corresponding with functional block diagram of sleep mode controller

| Case | LoS | Ready to sleep | LPF | CA1 = J | K | Q | C | Interrupt main processor | CA2 | Power to the DC-DC convertors |
|------|-----|----------------|-----|---------|---|---|---|--------------------------|-----|-------------------------------|
| 1 | 0 (continuous) | X | 0 | 0 | 1 | 0 | 0 | 0 | 0 | 1 |
| 1→2 | 0→1 | 0 | 0→1 (*) | 0 | 1→0 | 0→0 | 0 | 0 | 0 | 1 |
| 2→1 | 1→0 | 0 | 1→0 (*) | 0 | 0→1 | 0 | 0 | 0 | 0 | 1 |
| 1→3 | $n_1$ | 1 | 0 →1 | 0→1 | 1→0 | 0→1 | 0 | 0→1 | 0 | 1 |
| 1→5 | 0→1 | 1 | 0→1 (*) | 0 | 1→0 | 0→0 | 0→1 | 0→1 | 0 | 1 |
| 3→6 | 1→0 | 0 | 1→0 (*) | 0 | 0→1 | 1→0 | 0 | 1→0 | 0 | 1 |
| 4 | $n_2$ pulses | X | X | X | X | X | X | X | 1 | 0 |

(*) after time $\Delta t_2$ ration and Power Interface (ACPI) specification revision 5.0 [Reference: Advanced Configuration and Power Interface Specification Revision 5.0, Dec. 6, 2011]. ACPI specification defines multiple processor power sleeping states where the processor consumes less power than in the active power state. While in a sleeping mode, the processor does not execute any instructions. Each power sleeping state has a latency associated with entering and exiting that corresponds to the power saving.

Case 6:

The transition of the LoS line from HIGH to LOW, caused by the network switch, will bring the interrupt line of the main processor from HIGH to LOW (waveform FIG. 14). When the interrupt line 1340 of the main processor transitions from HIGH to LOW, then the main processor 332 will preferably become active again and will execute a software routine to power up again all the electronic devices that previously were switched off from the power. In this embodiment this is done by enabling again the DC-DC convertors that were switched off in case 3. Also the related device such as the display device or the image capturing device will be powered up via for example the VESA DPMS in case of the display device, and via for example USB in case of the image capturing device.

Figure 15:
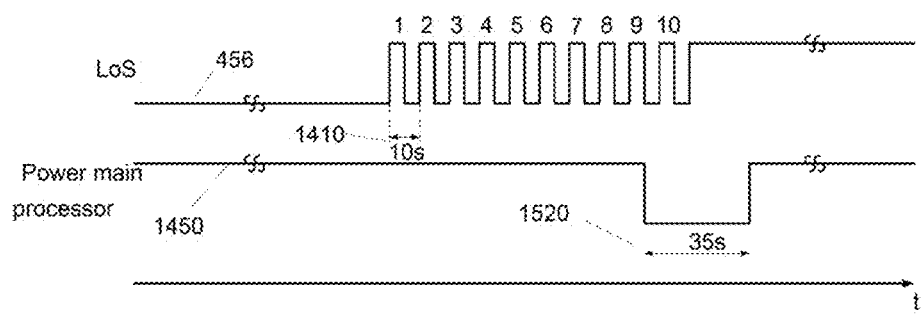
FIG. 15 shows waveforms for example of a power cycle.

Case 4:

When the sleep mode controller 310 receives a second specific signal such as a series of $n_2$=10 pulses of for example a frequency of 0.1 Hz, then a power cycle will be initiated after the 9th pulse. The power line 352 to the main processor 332 will be shut down for a time of for example 35s. After this time the power to the main processor 332 will be available again and the main processor will start up the complete network device and finally come again in the normal mode. The corresponding waveforms are shown in FIG. 15. As already explained earlier a power cycle will be executed when the network device is in the freeze state.

started upon receiving this interrupt signal. The interrupt is generated to the main processor 332. This interrupt service routine will switch off relevant components such as DC-DC convertors to the components that must be switched off in the sleep mode, and the related device such as the display device 180 or image capturing device 280 can also optionally be forced in the sleep mode via for example the VESA DPMS for the display device and via for example USB for the image capturing device, as in case 3.

It is important to note that the purpose of the sleep mode is to reduce the power consumption to a level much lower than the power consumption in the normal mode. Therefore it is important that a majority, most or all hardware is switched off during the sleep mode except the hardware to keep for the monitoring function to return to the normal mode. In this embodiment this is the sleep mode controller 310, the main processor 332 in sleep mode and part of the photo-electric transceiver 330. The only parts of the photo-electric transceiver 330 that should preferably remain powered on during the sleep mode are its controller 440 and the receiver 425. The transmitter part 420 should be switched off to reduce the power consumption.

Various other implementations of the sleep mode controller 310 are conceivable. For example the sleep mode controller 310 can be implemented as a state machine in for example FPGA technology or by using a micro controller. It is also possible to implement the high pass filter, the charge accumulators and the low pass filter as digital filters implemented in for example a micro controller circuit. These various implementations should preferably be implemented in low power consuming technologies.

Figure 16:
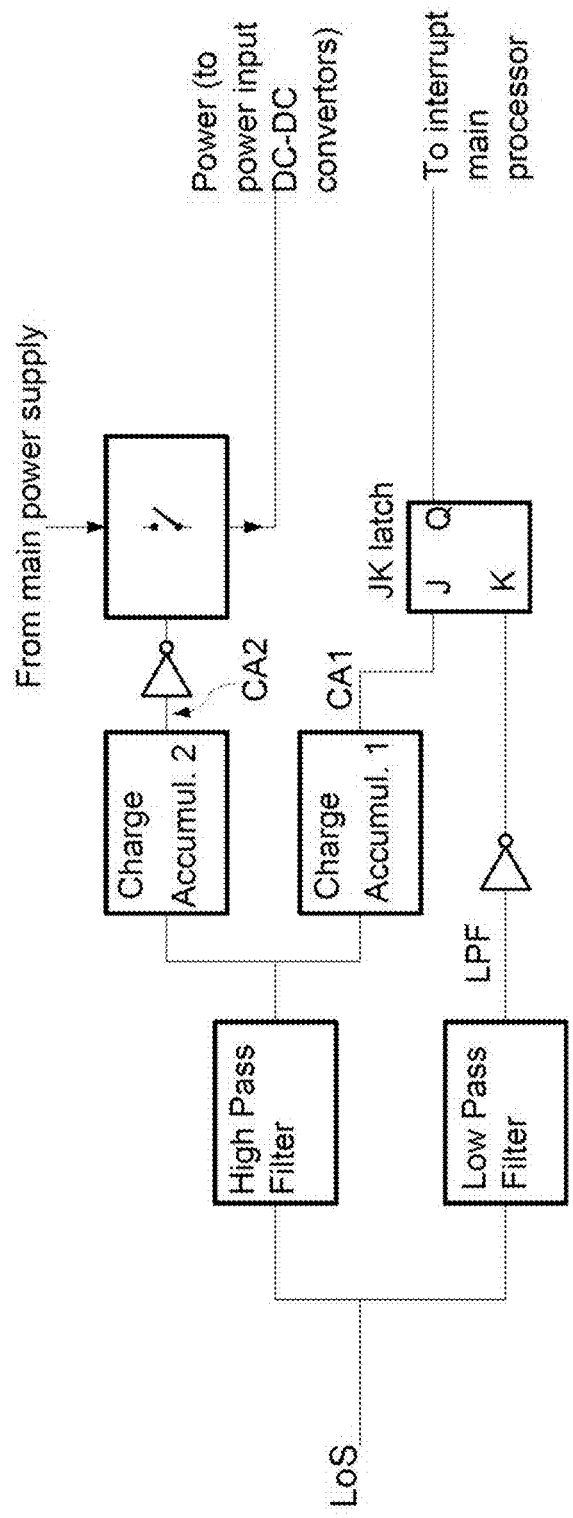
FIG. 16 shows an example of an alternative schematic diagram of a sleep mode controller without a ready to sleep input.

It is also possible to use a sleep mode controller without the ready to sleep mode input 1330 as shown in FIG. 16 and corresponding state Table 4. For this embodiment it is not possible to detect case (5).

TABLE 4

State table corresponding with functional block diagram of alternative sleep mode controller without the "ready to sleep" input.

| Case | LoS | LPF | CA1 = J | K | Q | Interrupt main processor | CA2 | Power to the DC-DC convertors |
|---|---|---|---|---|---|---|---|---|
| 1 | 0 (continuous) | 0 | 0 | 1 | 0 | 0 | 0 | 1 |
| 1→2 | 0→1 | 0→1 (*) | 0 | 1→0 | 0→0 | 0 | 0 | 1 |
| 2→1 | 1→0 | 1→0 (*) | 0 | 0→1 | 0 | 0 | 0 | 1 |
| 1→3 | $n_1$ pulses | 0→1 | 0→1 | 1→0 | 0→1 | 0→1 | 0 | 1 |
| 3→6 | 1→0 | 1→0 (*) | 0 | 0→1 | 1→0 | 1→0 | 0 | 1 |
| 4 | $n_2$ pulses | X | X | X | X | X | 1 | 0 |

(*) after time $\Delta t_2$

As already explained earlier a power cycle will beneficially be executed when the network device is in the freeze state.

Cases 1 and 2:

When the LoS signal 456 is continuous LOW or continuous HIGH, while ready to sleep 1330 signal is LOW, no actions will be preferably triggered. This is respectively Case 1 and Case 2.

Case 5:

When the LoS signal 456 becomes continuous HIGH, while the ready to sleep 1330 signal is HIGH then a transition from LOW to HIGH will be generated on the interrupt line 1340. An interrupt service routine will be It is also possible to provide embodiments of sleep mode controllers 310 with other time constants for the high pass filter, the low pass filter and/or the two charge accumulators. For these embodiments the frequency of the pulses on the LoS line 456 can advantageously be higher or lower compared with the above embodiment and should be preferably be matched to the time constants of the filters in the sleep mode controller 310.

Figure 17:
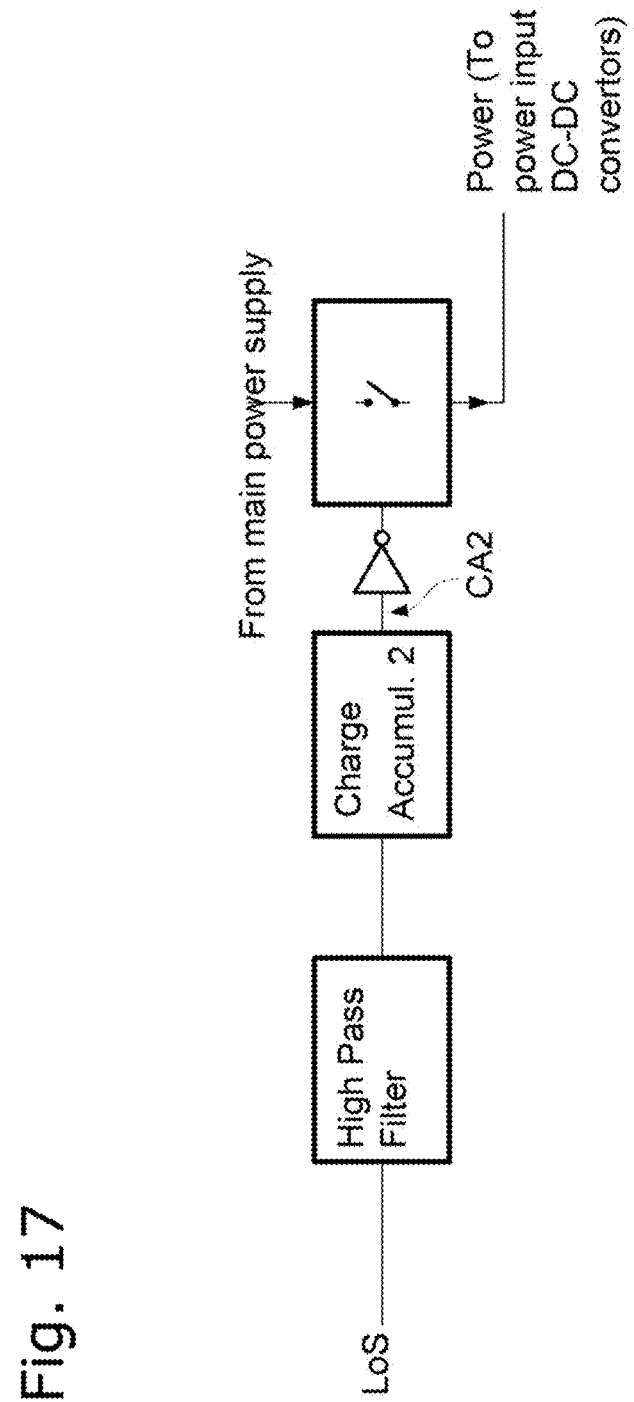
FIG. 17 shows a schematic diagram of the reset on LAN controller.

The present invention in one independent embodiment also provides a Reset on LAN controller. As already explained, the network device, being a computing system can hang or freeze ("freeze state"). In this state the network device is not responding to any common messages or commands. In Case 4, the power cycle or the reset function as already explained in detail above, can be activated (for example by the controlling the main program over the network) with the $n_2$ pulses on the LoS line. This function can be implemented, as depicted in FIG. 17, and can operate independently of the power save functionalities.

The "reset on LAN" functionality is very useful because many network devices can be located in places which are difficult to access. Therefore being able to detect a freeze state of a network device over the network, and reset these network devices over the network is very useful.

In the present invention the normal network functions of the remote network device to support the conventional communication protocols are completely disabled in the sleep mode by switching off the power of the components for these functions in the network device. Consequently a lower power consumption and more robust operation are achieved compared with the prior art.

What is claimed is:

1. A method for remote controlling a power consumption state of a first network device, wherein the network device is linked by communications connection to a network and to a second network device, the first network device having a normal power consumption state and a low power consumption state, the method comprising:
   execution of a communication protocol to change the power consumption state of the first network device such that:
      when a sleep announcement signal from a second network device to initiate the transition of the first network device to the low-power consumption state is sent and a ready-for-sleep mode signal from the first network device is not detected by the second network device after a first predetermined time period, a power reset cycle of the first network device is initiated,
      when the communications connection is disrupted the first network device is maintained in the normal power consumption state, and
      when the network device receives a first specific signal, it enters the low power consumption state.

2. The method of claim 1 wherein
   the communication protocol executed to change the power consumption state has at least the following properties:
      at least a first sequence of off-, on- and off-states is communicated on network to the first network device; and
   wherein the communication protocol leads to the first network device being in the low power consumption state.

3. The method according to claim 2, wherein the first sequence controls the transition to a low-power consumption state.

4. The method according to claim 1, wherein the communication protocol comprises a sleep announcement signal from a second network device to initiate the transition of the first network device to the low-power consumption state.

5. The method according to claim 1, wherein the communication protocol comprises a ready-for-sleep mode signal transmitted from the first network device to the second network device.

6. The method according to claim 1, wherein the communication protocol comprises a second sequence of off- and on-states different from the one or more on- and off-states of the first sequence, to initiate the power reset cycle.

7. The method according to claim 1, wherein one value of a binary state in a sequence is interpreted as a loss of signal by the first network device and entails the other value of the binary state of a loss of signal.

8. The method according to claim 7, wherein at least the first sequence causes the other value of the binary state of the loss of signal state.

9. The method according to claim 1,
   wherein the second network device is controlled by a main program over an IP network; and
   wherein a sequence of high and low states is communicated by the main program in form of enable, disable control commands of a port, or a sequence is communicated in form of an enable toggle port command specifying a number and sequence for a respective port.

10. The method according to claim 1,
    wherein the first network device controls a third device and the respective power consumption state of the third device.

11. The method according to claim 10, wherein the third network device is a display or an image recording device.

12. The method according to claim 1, wherein the network is selected from an optical, a wired, a wireless network and an IP network.

13. The method according to claim 1 wherein the second network device comprises a network switch.

14. A communication arrangement for remote controlling a power consumption state of a first network device and a second network device, wherein the first network device is linked by a communications connection to a network and to the second network device, the first network device having a normal power consumption state and a low power consumption state, the arrangement comprising:
    means for execution of a communication protocol to change the power consumption state of the first network device such that
       when a sleep announcement signal from the second network device to initiate the transition of the first network device to the low-power consumption state is sent and a ready-for-sleep mode signal from the first network device is not detected by the second network device after a first predetermined time period, a power reset cycle of the first network device is initiated,
       when the communications connection is disrupted the first network device is maintained in the normal power consumption state, and
       when the network device receives a first specific signal it enters the low power consumption state.

15. The arrangement according to claim 14 further comprising:
    a control main program running on a processing engine, wherein the processing engine is coupled via a network with the second network device and the second network device is coupled with the first network device via the communications network.

16. The arrangement according to claim 14, further comprising:
    an interface at the first network device for a third device coupled to the first network device.

17. The arrangement according to claim 16, wherein the third network device is a display or an image recording device.

18. The arrangement according to claim 14, wherein the network is selected from any of an optical, a wired, a wireless network and an IP network.

19. The arrangement according to claim 14, wherein the second network device comprises a network switch.

\* \* \* \* \*